Patented July 12, 1949

2,475,655

UNITED STATES PATENT OFFICE 2,475,655

SERUM FOR TREATMENT OF CANINE ENCEPHALITIS

Charles Herman Beckman, St. Louis, Mo.

No Drawing. Original application December 24, 1941, Serial No. 424,236. Divided and this application November 26, 1945, Serial No. 630,981

5 Claims. (Cl. 167—78)

This invention relates to the treatment of canine encephalitis.

Canine encephalitis is a distinct disease, which, prior to my discovery, was not recognized as such but many writers have described a similar condition as a sequel to canine distemper. English writers have been probably the first to report this condition as associated with distemper. In this country it has often been termed the nervous form of distemper and treated as such, with very little success. Since the development of effective immunization against distemper, it has been clearly demonstrated that there is a distemper-like condition against which these immunization methods will not protect.

This lack of protection has often been considered a "break" and the immunizing product has been condemned. These so-called breaks are in many instances due to the virus of encephalitis, which acts upon the central nervous system or various parts of it. As a result of this, a variety of symptoms may be observed in different organs of the animal, depending upon the portion of the central nervous system involved.

Several hundred dogs in various stages of the disease have been observed and approximately fifty have been studied post-mortem.

This application is a division of my application Serial No. 424,236, filed December 24, 1941, upon which U. S. Patent No. 2,391,540 was issued December 25, 1945.

Encephalitis is widely distributed throughout the United States, but occurs most frequently in cities and especially where dogs are more thickly congregated. A few cases have been reported in rural sections. It has been observed that the disease may be enzootic in nature, affecting most of the dogs in certain areas. This was first demonstrated by a number of dog heads that were sent in from the same area to be examined for rabies. Negri bodies could not be found in brain smears from these animals, and rabbits injected with brain tissue showed no symptoms of rabies. The brains of these animals were very congested and there was no history of these animals appearing vicious or attacking other animals. Places in which dogs are kept or handled, such as pet shops, breeding kennels, dog pounds, humane society shelters, and veterinary hospitals, may become contaminated with the virus, and susceptible animals will be apt to contact the disease when kept in these places for a relatively short period of time.

Anatomical changes are principally in the central nervous system. These in turn may lead to further changes in other parts of the body. The meninges are very congested and in severe cases there is some hemorrhage. The congestion is most marked posterior to the cruciate fissure of the cerebrum. The meninges are firmly adherent to the calvarium and, when pulled apart, leave the surface of the bone dry and roughened. The blood vessels of the entire brain are distended with blood and there is congestion throughout the brain. The extent of the congestion varies with the severity of the case, and duration of its course.

The amount of fluid in the brain also varies. Very often it is sufficient to exert considerable pressure and when a cisterna puncture is made the fluid flows freely, as much as 20 cc. having been taken from the brain of a dog of average size. This fluid fills the ventricles and the arachnoid space. The pressure is sufficient in some cases to cause an enlargement of the lateral ventricles. The brain stem and cord are congested in most cases. Fluid along the spinal cord is not under as great a pressure nor so abundant as in the brain.

In many cases there is a fatty substance surrounding the spinal cord. This substance is present in greatest amount in the thoracic and lumbar regions. In mild cases this fatty substance may be absent or found only in the lumbar region. In severe cases it may surround the entire cord and be $\tfrac{1}{16}$ inch thick. The exact nature or significance of this substance has not been determined.

There is a cloudiness of the aqueous humor in the eyes of many cases and the iris is contracted or dilated, causing blindness. The skin of the abdomen is pink to scarlet red in color, without any of the blisters or blebs commonly seen in distemper. The skin is hypersensitive and especially so in the region of the head and neck. Total or partial paralysis of the jaw, tongue, hind quarters, or front limbs may be observed. In autopsy the liver is often light yellow in color and slightly enlarged. All other organs appear normal unless there are some complicating conditions.

The symptoms of encephalitis are variable, depending upon the severity of the attack and the parts of the body affected most. Animals brought in for treatment usually have a history of beginning with "running fits," as expressed by the owner. They may have had one or more of these attacks which recur at irregular intervals, often being brought on by overexcitement or some outside stimulus such as the sight of the owner or another animal. The animal drops over to its side in convulsions.

In most cases the owner has failed to observe the early symptoms of the disease or has paid little attention to them. In some cases these symptoms are very mild and the beginning paralysis of various parts of the body is the first noticeable symptom. This is especially true in old dogs. In one case a dog six years old had no history of any disease condition until the beginning paralysis of the hind limbs, which became completely paralyzed. There also developed excessive salivation and sudden opening of the mouth at regular intervals. The lower jaw dropped suddenly and then closed slowly. This developed to such an extent that it was difficult for the animal to lap water.

In some cases paralysis of the jaw and tongue is present. When liquids or food are put on the back of the tongue they can be swallowed. Such symptoms are suggestive of rabies, but animal inoculation and microscopic examination of the brain have shown such dogs to be negative to rabies. The symptoms observed in these forms of encephalitis are in many respects identical with those seen in Parkinson's disease or postencephalitis of man.

In experimentally produced cases, and naturally infected cases obtained at the onset of the disease, characteristic symptoms have been observed. These are most commonly seen in young dogs and puppies. When the disease first attacks, there is a rise of temperature which may soon drop to normal or even subnormal. There is a watery discharge from the eyes and nostrils. This discharge may become purulent in some cases if secondary infections develop, but unless these develop, the discharge remains clear.

The membrana nictitans and sclera are highly congested and the eye has a very characteristic appearance. The aqueous humor of the eye is cloudy. Upon casual observation, the iris of the eye appears to be drawn open so that the pupil seems to cover the entire eye, but when the eye is examined closely with a light it can be seen that the iris is contracted so that the pupil is almost a pinpoint. If there is any reaction to light at all, it is very slow and this reaction becomes less as the disease progresses. This contraction of the pupil indicates that the disease has affected the crura or pons. The cloudiness of the aqueous humor may start at one side and spread over the eye until the entire cornea is covered.

The general expression about the head and face is that of depression and pain. The muscles of the face are drawn, particularly those of the lips. The muscles on one side may be drawn more than those of the other side. The fore limbs may be spread wide apart as if to balance the body, or they may be crossed. One or both hind limbs may be drawn up, with the patella touching the last rib or high into the flank. Some animals do not care to move about but lie in a semi-comatose condition until they are disturbed. Other animals are restless and move or run about aimlessly, bumping into objects, barking and howling.

The skin is hypersensitive in many cases and especially so in the region of the head and neck. An animal may be lying in a semi-comatose condition and, when touched, snap aimlessly as a result of the pain. Many of these cases are diagnosed as rabies. Respiration may be jerky or labored. The temperature may reach 106° F. but is usually 102° to 103° F.

All animals do not have convulsions. The more acute cases may have convulsions until they die. Less acute cases have convulsions only when there is some outside stimulus or exciting cause. When in a state of convulsions the animal is somewhat similar to one with strychnine poisoning. First there is a rapid champing of the jaws until the saliva, which is abundant, becomes a foamy mass about the mouth. As this continues, the muscles of the body become rigid. The legs are extended and the head is drawn back. Clonic spasms continue for a time and then subside, leaving the animal completely exhausted for some time.

Many animals with a mild form of the disease appear normal after having had convulsions, and the condition may not recur for several days. Some animals appear dehydrated, and lie around in a semi-comatose condition. Often choreic movements develop in such animals. Convulsions are more severe and occur more frequently in younger dogs.

The diagnosis of encephalitis in some of its stages is not difficult, but there are stages at which it is hard to differentiate it from distemper, dietary deficiencies and rabies. The watery discharge from the eyes and nostrils instead of a mucopurulent discharge, the pink and reddened skin over the abdomen, the absence of vesicles on the abdomen, and the clouded aqueous humor, with the constricted or dilated pupil, will help to differentiate encephalitis in its early stages from distemper.

Changes in the diet do not seem to have any beneficial effect on or any control of fits in encephalitis cases. It is difficult to differentiate between the dumb form of rabies and the comatose condition of encephalitis, or the cases of encephalitis with paralysis of the jaw and tongue. Dogs with encephalitis, and paralysis of the jaw and tongue, can swallow if a liquid or food is put on the posterior part of the tongue. This is not true in rabies, as the throat is paralyzed. Such cases should always be handled as rabies. Laboratory findings, and animal inoculation with the brain of such animals, should be relied upon.

In acute gastro-enteritis the anterior chamber (aqueous humor) of the eye is clear and the pupil reacts to light. The animal may vomit frequently and show signs of pain in the abdomen upon palpitation. In encephalitis these symptoms originate from the brain, as the intestinal tract is seldom involved except as a secondary condition.

The prognosis is usually unfavorable. If the animal survives the early stages of the disease, it may later develop post-encephalitis conditions such as chorea, blindness, paralysis of one or more limbs, paralysis of the jaw, or it may be a dummy.

Treatment is more or less symptomatic and has not proved satisfactory in most cases. Sedatives are not effective to control the convulsions in many cases. Intravenous injections of nembutal or barbiturates may have no effect at all, or the drug may be delayed in its action which will last only a short time. Additional injections of barbiturates or their derivatives are not advisable. Ice packs applied to the head will relieve the animal in a short time and stop the convulsions temporarily. Animals showing symptoms of severe cranial pain and convulsions have been placed in an icebox at 40° F. The condition was relieved and in ten minutes the animals became quiet, with no more convulsions as long as the head was kept cool. Removal of the fluid in the brain by cisterna puncture has given relief in some cases.

Careful investigation has successfully proven that canine encephalitis is caused by a virus, that a dog can be immunized by a vaccine, and that a serum containing antibodies can be used successfully in treatment of the disease. The method of preparing vaccine is described and claimed in my co-pending application Serial No. 424,236, filed December 24, 1941, upon which U. S. Patent No. 2,391,540 was issued December 25, 1945.

Serum prepared from the blood of a dog which has recovered from the disease, or one which has been immunized by a vaccine, and then injected with the living virus, has given good results. Unless secondary conditions have developed, or the disease has progressed too far, one injection of serum will restore the animal to a normal state. The animal should be kept as quiet as possible for at least ten days, and should not be excited. Medicinal treatment may be employed if complicating infections occur.

In post encephalitis there is a permanent or semi-permanent nerve disfunction or impairment usually located in the central nervous system, as evidenced by results from various methods of treatment. These choreic movements (palsy), Parkinsonian disease, paralysis agitans, may be helped, and in some cases completely relieved by repeated injections of the vaccine at stated intervals ranging from three injections one week apart, to more injections five days apart in severe cases. These cases have been treated by surgery which included removal of the impaired or damaged nerve cells. They have also been treated by medication, Bulgarian belladonna, or the alkaloids, which has an affinity for nerve tissue and greater affinity for damaged nerve tissue, completing the impairment or completing the destruction of the cells involved. The same results are obtained as in surgery or the use of vaccine, but the drug and vaccine methods are attended with less shock, the vaccine methods particularly being the safest. Another method of treatment of these cases is by artificial fever induced by short wave or kindred means, diathermy, infrared, or other methods of raising the temperature of the body above 105° F.

A final method I found effective was the injection of virus of encephalitis which accomplished its results by the destruction or inhibition or impairment of the damaged nerve cells. The virus method has proven the most rapid, but it has attending danger.

I find the vaccine method to be superior in that it is less dangerous and secures maximum results.

A more particular description of the method of preparing the serum is here given. A dog which has been immunized by a vaccine may be used in place of one which has recovered from the disease naturally acquired. In a dog naturally recovered from encephalitis, a small amount of virus of canine encephalitis is injected, after a waiting period of thirty to sixty days following such recovery. After this injection of the virus, the reactions which take place are carefully watched. When the dog has substantially recovered from its reactions, at a time within thirty to sixty days of the first injection according to the condition and reaction of the animal, a second injection is made doubling the amount of the virus given in the first injection. Blood for the serum may be drawn after forty-five to sixty days from the second injection. This blood is defibrinated with any known defibrinating agents, such as sodium citrate, or by the glass bead shaking process, or the beader process, and a preservative chemical substance is added to the blood serum thus remaining. The red corpuscles may be separated out by centrifuging the remaining liquid, and the serum withdrawn and placed in sterile containers. The serum is then tested for potency, on live animals, to determine the dosage necessary in the treatment of active virulent disease.

After the animal donor thus bled has recovered from the loss of blood, usually a period of ten to twenty days, another injection of virulent virus is given, again doubling the amount of the preceding injection and the blood withdrawn as above mentioned. This is repeated until a maximum potency is produced and the animal is kept at this maximum potency by repeated injections of virus. This potency is determined by standardized tests on live animals.

Another method of liquefying and maintaining the blood as a whole blood serum is to defibrinate the serum, removing the fibrin and defibrinating material, adding immediately the chemical preservative, and adding sufficient glucose or dextrose to make a 2½% to 5% solution, which will prevent hemolysis or maintain the whole blood serum in a liquid injectionable condition.

Other species of animals, such as a horse, cow, sheep, goat, or hog, may be employed in the production of serum in the above described manner, but the resulting products are not as beneficial to the canine as that produced in the canine.

I believe that I am the first to discover or recognize that canine encephalitis is a distinct disease and to prove that it is a virus disease. That is, one which can be prevented in virulent form by a vaccine containing the attenuated remains of the virus, and one which can be successfully treated, especially in its earlier stages, by a serum containing the antibodies of the disease. While I have described methods for producing the serum, other methods and other techniques may be employed while retaining the essence and benefit of the discovery.

I claim:

1. A serum for the treatment of canine encephalitis produced by injecting in a dog naturally recovered from encephalitis a small amount of the virus of canine encephalitis after a waiting period of from thirty to sixty days following such recovery, injecting said dog within thirty to sixty days after the first injection with a second injection of the virus of canine encephalitis double the amount of the first injection, withdrawing blood from said dog within forty-five to sixty days after the second injection, defibrinating the blood so withdrawn and separating from said defibrinated blood the red corpuscles thereof.

2. A serum for the treatment of canine encephalitis produced by injecting in a dog immunized by a vaccine for canine encephalitis a small amount of the virus of said disease, injecting said dog within thirty to sixty days after the first injection with a second injection of the virus of canine encephalitis double the amount of the first injection, withdrawing blood from said dog within forty-five to sixty days after the second injection, defibrinating the blood so withdrawn and separating from said defibrinated blood the red corpuscles thereof.

3. A method for producing a serum for the treatment of canine encephalitis comprising the steps of injecting in a dog naturally recovered from encephalitis a small amount of the virus of canine encephalitis after a waiting period of from thirty to sixty days following such recovery, injecting said dog within thirty to sixty days after the first injection with a second injection of the virus of canine encephalitis double the amount of the first injection, withdrawing blood from said dog within forty-five to sixty days after the second injection, defibrinating the blood so withdrawn and separating from said defibrinated blood the red corpuscles thereof.

4. A method for producing a serum for the treatment of canine encephalitis comprising the steps of injecting in a dog immunized by a vaccine for canine encephalitis a small amount of the virus of said disease, injecting said dog within thirty to sixty days after the first injection with a second injection of the virus of canine encephalitis double the amount of the first injection, withdrawing blood from said dog within forty-five to sixty days after the second injection, defibrinating the blood so withdrawn and separating from said defibrinated blood the red corpuscles thereof.

5. A method for conditioning a dog as an animal donor for the production of a serum for the treatment of canine encephalitis comprising the steps of injecting in a dog naturally recovered from the disease or immunized by a vaccine for the prevention of said disease a small amount of the virus of canine encephalitis after a waiting period of from thirty to sixty days following such recovery or immunization, injecting said dog within thirty to sixty days with a second injection of the virus of canine encephalitis double the amount of the first injection, withdrawing blood from said dog within forty-five to sixty days after the second injection, waiting for a period of ten to twenty days after the first withdrawal of blood and again injecting the dog with the virulent virus of canine encephalitis in an amount doubling the amount of the preceding injection and repeating the steps of withdrawal of blood and the injection of virulent virus until a maximum potency is produced and thereafter keeping the animal at said maximum potency by repeating injections as aforesaid.

CHARLES HERMAN BECKMAN.

REFERENCES CITED

The following references are of record in the file of this patent:

UNITED STATES PATENTS

| Number | Name | Date |
|---|---|---|
| 2,391,540 | Beckman | Dec. 25, 1945 |

OTHER REFERENCES

Beckman and Torrey, "Canine Encephalitis—Preliminary Report" in the North American Veterinarian, vol. 21, No. 4, April 1940, pages 232, 233, and "Further Studies on Canine Encephalitis" in same journal, vol. 22, No. 1, January 1941, pages 39–46.

"Immunological Studies on Equine Encephalomyelitis" by Eichhorn in J. Am. Veterinary Med. Assn., pp. 285–290, Nov. 1938, reprint in 167—78E.